July 20, 1965 W. W. BULGRIN ETAL 3,195,491

EQUIPMENT FOR PRODUCING TAPERED DISK WHEELS

Original Filed Sept. 26, 1960 4 Sheets-Sheet 1

EQUIPMENT FOR PRODUCING TAPERED DISK WHEELS

Original Filed Sept. 26, 1960 4 Sheets-Sheet 2

EQUIPMENT FOR PRODUCING TAPERED DISK WHEELS

Original Filed Sept. 26, 1960

4 Sheets-Sheet 3

United States Patent Office 3,195,491

Patented July 20, 1965

3,195,491
EQUIPMENT FOR PRODUCING TAPERED DISK WHEELS

Walter W. Bulgrin, Akron, Ohio, and Gordon C. J. Parent, Southgate, Mich., assignors to The Firestone Tire & Rubber Company, Akron, Ohio, a corporation of Ohio Original application Sept. 26, 1960, Ser. No. 58,580. Divided and this application Nov. 29, 1961, Ser. No. 155,788

11 Claims. (Cl. 72—82)

This application is a division of our copending application Serial No. 58,580, filed September 26, 1960, and assigned to the assignee of the present application.

The invention relates to an improved continuous operation for producing disk wheels of conventional shape and cross section having optimum physical characteristics, and more particularly to a continuous wheel-making operation comprising a minimum number of steps.

Conventional disk wheels for automotive vehicles are generally bowl-shaped with a flat hub portion and a curved intermediate portion terminating in a cylindrical rim flange, and usually having an annular shoulder or nave therein. The cross sectional thickness tapers from the hub out to a relatively thin rim flange. The thin rim flange reduces weight at the periphery of the wheel while still providing adequate resiliency and impact strength. Hand holes are formed in the curved intermediate portion to provide spoke portions and further reduce weight and increase resiliency, and to provide access for inflating dual wheels.

Various methods have been practiced for producing such disk wheels, including a series of die-forming operations, a combination of extruding and die-forming operations, and a combination of hot or cold rolling a flat blank to taper it and then die-forming. In all of such methods of which we are aware, the metal is improperly stressed or inadequately worked to produce optimum physical characteristics in the final product.

The present invention contemplates making the disk wheel by cold spinning the curved bowl of tapering thickness from a flat blank without improperly stressing the metal, to obtain optimum physical characteristics requiring a minimum of die-forming to shape the disk into final form.

Certain prior attempts have been made to produce disk wheels by spinning, but in such cases the wheel was unduly stressed radially by the spinning operation itself or by forming operations before or after the spinning operation in order to produce the desired curved bowl shape of tapering thickness.

It is an object of the present invention to provide an improved apparatus for producing a wheel disk from a flat blank by spinning and die-forming operations which do not unduly stress the metal.

Another object is to provide an improved apparatus for continuously producing disk wheels in a minimum number of operations.

Other objects include the provision of improved blanking means, improved spinning means, improved die-forming and piercing means, improved disk and rim assembling means, and improved welding means, all cooperating to carry out the improved method of producing an improved wheel disk and rim and disk assembly.

These and ancillary objects are accomplished by the improved methods, apparatus and articles disclosed and claimed herein, preferred embodiments of which are shown by way of example in the accompanying drawings and described in detail herein. Various modifications and changes in details of construction are comprehended within the scope of the invention defined in the appended claims.

In carrying out the invention, a flat circular disk is blanked, edge-machined, and then spun on a mandrel in such manner as to form curved bowl shape of tapering thickness by progressively displacing elements of the metal axially on a curved mandrel while maintaining the outer diameter of the disk constant, then die-forming the bowl into finished shape without unduly stressing the intermediate curved portion thereof, piercing the hand holes and hub bolt holes in the formed disk, press fitting the formed disk into a rim, and finally circumferentially welding the rim to the disk.

Figure 2:
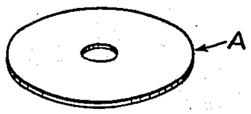
FIG. 2 is a perspective of the flat circular blank from which the bowl portion of the wheel is formed.
Figure 3:
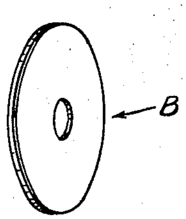
FIG. 3 is a perspective view representing the blank after machining its outer edge.
Figure 4:
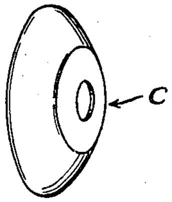
FIG. 4 is a perspective view of the spun bowl.
Figure 5:
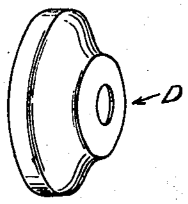
FIG. 5 is a perspective view of the bowl die-formed into finished shape.
Figures 6, 7:
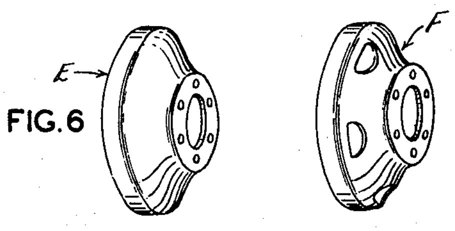
FIG. 6 is a perspective view of the formed bowl after piercing bolt holes in the hub portion.
FIG. 7 is a perspective view of the formed bowl after piercing hand holes in the intermediate portion.
Figures 12, 13:
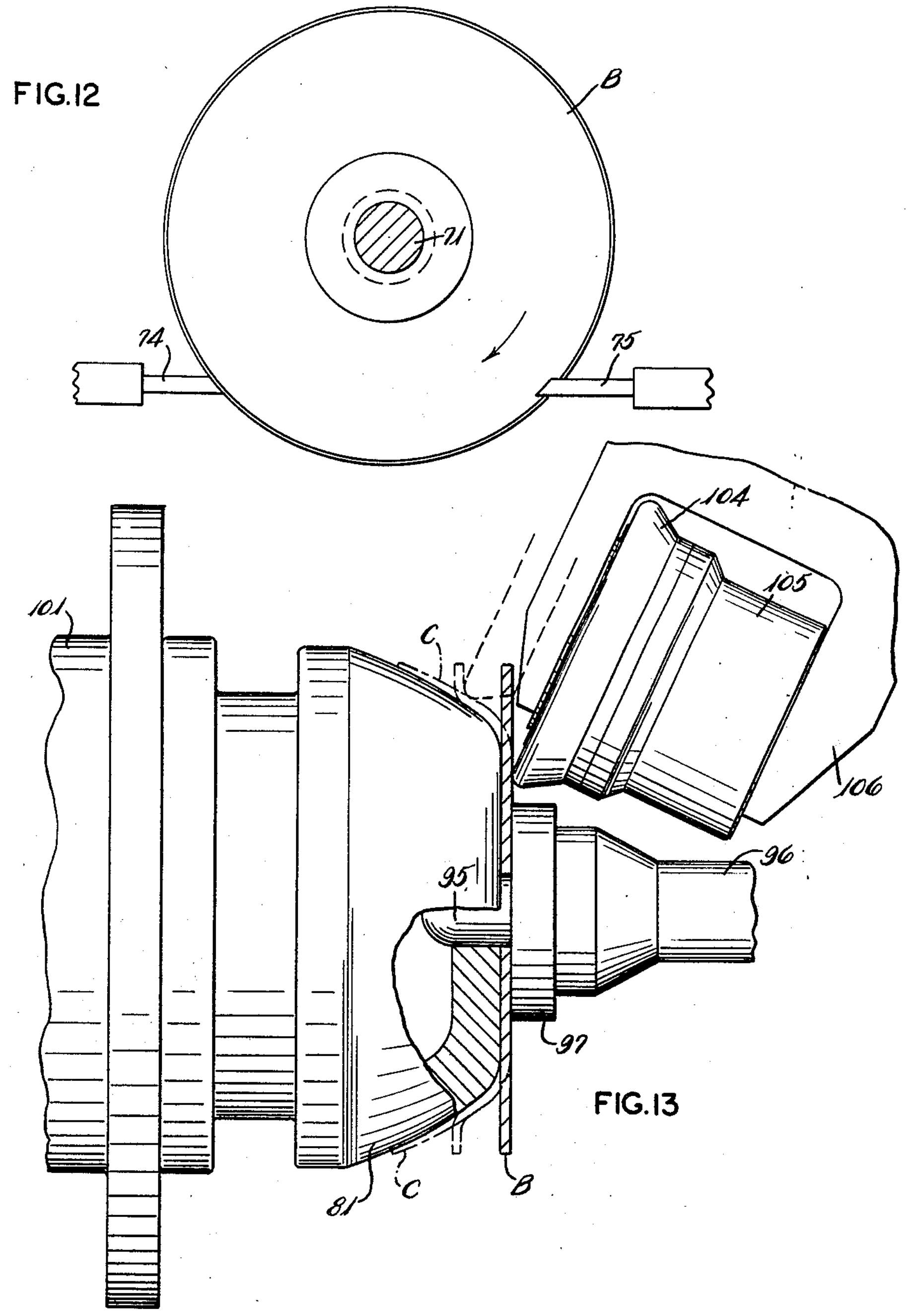
FIG. 12 is an enlarged schematic view showing the edge-turning and chamfering operations.
FIG. 13 is an enlarged elevational view, partly in section, showing the improved spinning operation.

In making a disk wheel from flat steel plates or sheets (FIG. 2); having the conventional shape with tapering thickness shown in perspective in FIGS. 5–7, the wheels are spun from the flat circular edge-machined disk B shown in FIG. 3 to the intermediate bowl shape C of FIG. 4 (shown in cross section in FIG. 13), and then die-formed to the finished shape D of FIG. 5 followed by hole piercing, coining and machining operations. A detailed disclosure of apparatus for performing these preliminary and intermediate operations of the present process is set forth in copending K. Luther et al. U.S. application Serial No. 58,582, filed September 26, 1960, now U.S. Patent No. 3,143,015, and assigned to the assignee of the present application, to which reference is made for the disclosure of such other and further particulars as may be necessary to instruct one skilled in the art in the practice of the present invention.

The aforementioned copending U.S. application Serial No. 58,582 discloses details of methods and apparatus for blanking and piercing blank A of FIG. 2 from flat sheets or plates in a hydraulic press. These or other suitable preliminary operations may be performed to provide a suitable blank A for the spinning operation and subsequent operations hereinafter described.

Figure 10:
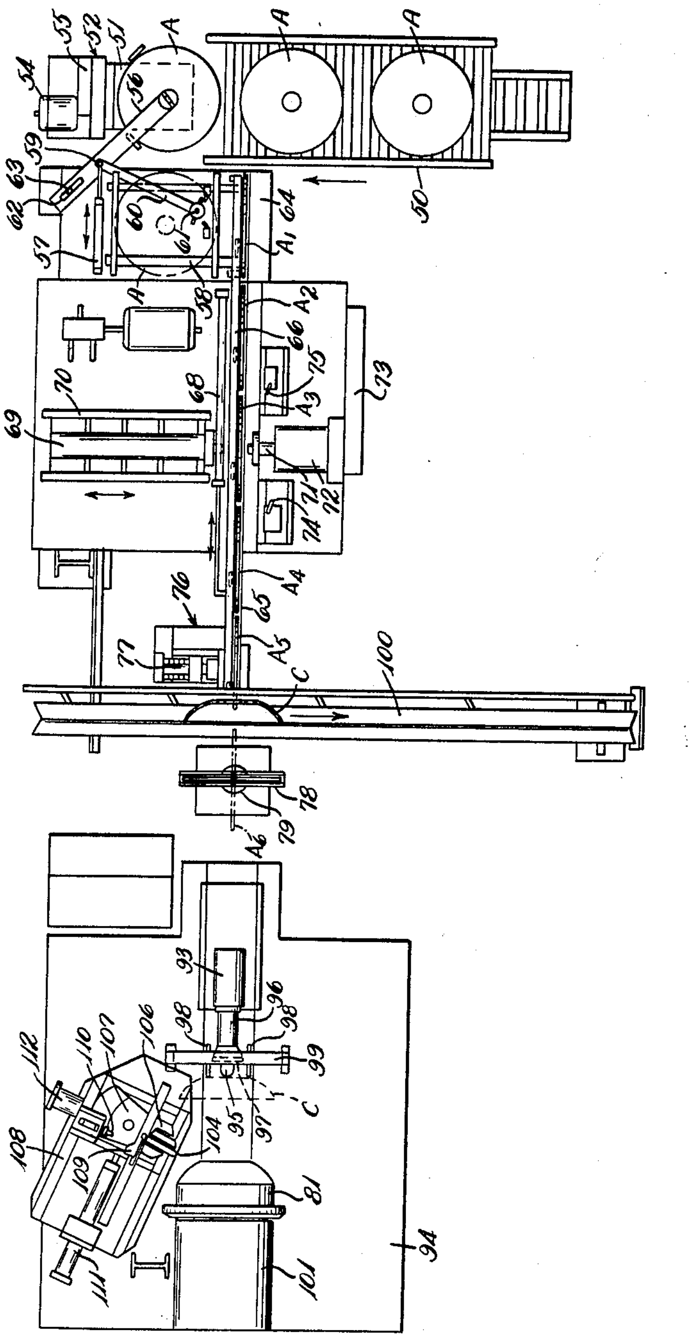
FIG. 10 is a schematic plan view of the improved spinning apparatus.
Figure 11:
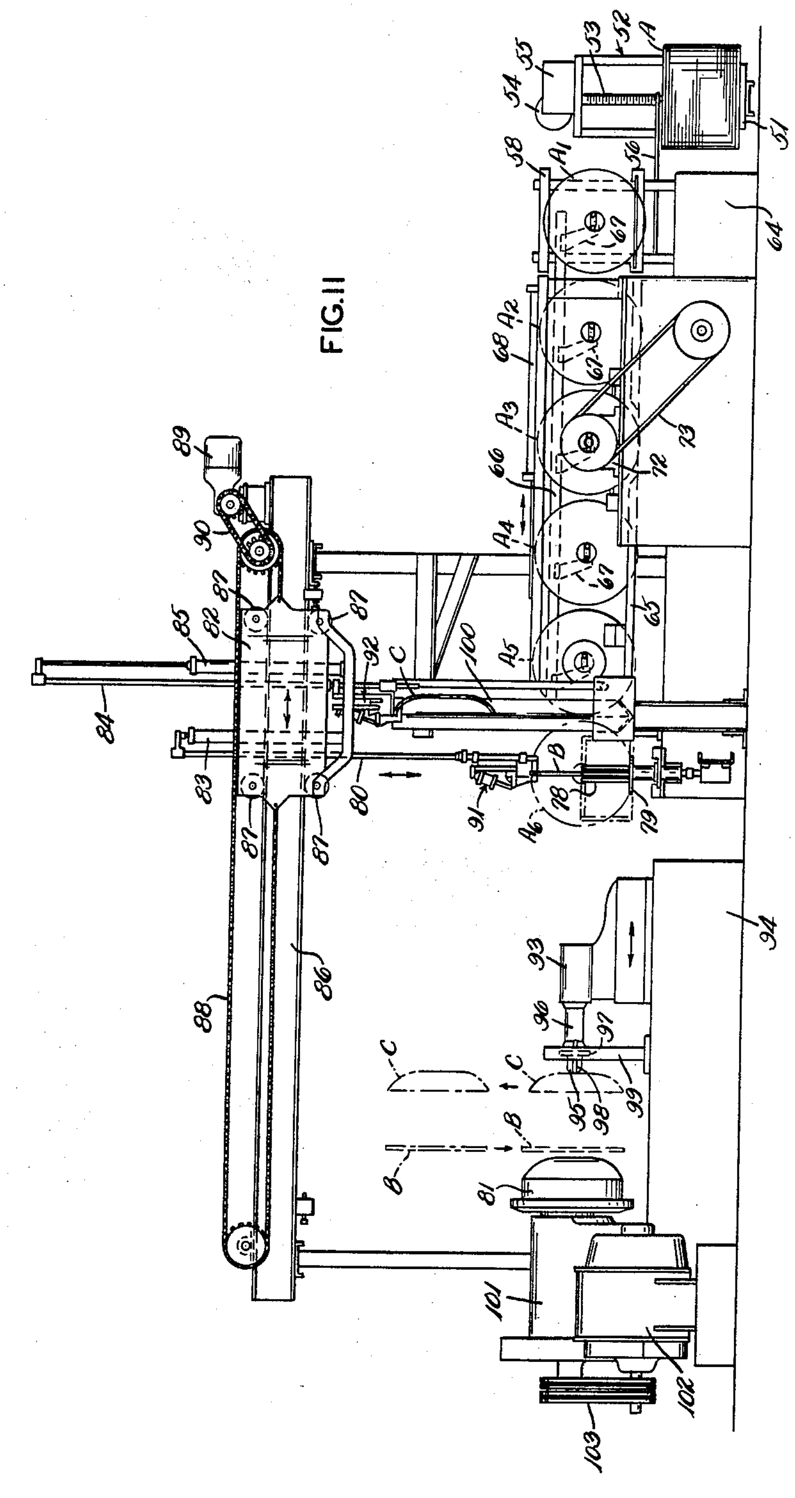
FIG. 11 is a front elevation thereof.

Referring to FIGS. 10 and 11, stacks of the blanks A are conveyed or taken to a feeder conveyor 50 which feeds the stacks successively onto the table 51 of a stack lifter 52. The table 51 is raised and lowered by a vertical screw 53 which is driven by a motor 54 through a gear box 55.

The height to which the stack is raised is determined by a limit switch (not shown) which contacts the top blank A on the stack, and a transfer arm 56 has a finger at its outer end which engages in the hub hole of the top blank only. A hydraulic cylinder 57 actuates the transfer arm 56 to slide a top blank A from the stack onto a swinging lift rack 58 when the rack is in the horizontal position shown in FIG. 10.

The transfer arm 56 is connected by a floating pivot 59 to one end of an arm 60, the other end of which is pivoted at 61 on the base of the machine. The outer end of transfer arm 56 has a slot 62 engaging a stationary pin 63 on the machine. This arrangement provides for transferring the top blank A from the stack in a straight line longitudinally of the machine onto the rack 58.

The rack 58 is pivoted at its inner end on a base 64 for swinging from a horizontal to a vertical position and may be actuated by any suitable means (not shown). The swinging movement of the rack 58 is suitably coordinated with that of the transfer arm 56 so that when a blank is placed on the rack the arm returns to pick up another blank from the stack, and the rack swings to the vertical position of FIG. 11.

When the rack 58 is in vertical position, the blank A thereon is aligned with a longitudinal track 65 adapted to guide a series of blanks longitudinally of the machine. A traveling arm 66 extends alongside of the track and has a plurality of depending arms 67 having fingers at their lower ends adapted to engage the hub holes of blanks on the track 65. The finger on the rearmost arm 67 is adapted to engage in the blank A supported on the rack 58 in vertical position.

The traveling arm 66 is reciprocated by a hydraulic cylinder 68 controlled by suitable controls such as limit switches, not shown. As the arm 66 is reciprocated, the blanks A are advanced longitudinally along the track 65 step-by-step to the various stations or positions $A_1$–$A_6$ shown in FIG. 11, and when a blank A is advanced from the rack 58 onto the track 65, the rack swings back to horizontal position to receive the next successive blank from the transfer arm 56.

When a blank reaches the station $A_3$, the outer edge surface thereof is machined and one corner is chamfered. At this station is a tailstock 69 movable on a transverse slide 70 and having a nose which is inserted through the hub hole of the blank, and displacing the blank so that the nose fits in the spring-loaded spindle 71 of the headstock 72. With the blank in this position, the spindle is then rotated by a drive belt indicated at 73, and the blank is engaged by a turning tool 74 on one side and by a diametrically opposite chamfering tool 75 (see FIG. 12). The turned and chamfered disk is designated "B" in FIGS. 3 and 12.

The disk B is then advanced along the track 65 to the positions $A_4$ and $A_5$ successively. At the position $A_5$ a suitable lubricant is applied to one surface of the disk to prepare it for the spinning operation. This lubricant may be applied by a device indicated generally at 76 which has a spindle 77 for rotating the disk while pressing a bar of tallow or the like against the surface of the disk.

When each disk B reaches station $A_6$ it enters a rack 78 supported on a turntable 79, the aligned position of the rack being indicated in phantom in FIG. 11. The turntable is then rotated 90° to the full line position shown in FIGS. 10 and 11 so that the disk B is positioned transversely of the machine. In this position, the disk B is adapted to be picked up by an overhead traveling arm indicated at 80 in FIG. 11 and carried forward to the spinning mandrel 81.

The lifting arm 80 is mounted on a carriage 82 and is raised or lowered by a hydraulic cylinder 83 on said carriage. A second lifting arm 84 is similarly mounted on said carriage to the rear of arm 80 and is adapted to be raised and lowered by hydraulic cylinder 85 on said carriage. The carriage 82 is movable along a longitudinal beam 86 by means of rollers 87 rolling on the top and bottom of the beam. The carriage is attached to a drive chain 88 which is driven by a motor 89 and chain 90 for reciprocating the carriage back and forth on the beam 86.

Each of the arms 80 and 84 have at their lower ends toggle clamps indicated generally at 91 and 92, respectively, having clamping jaws which preferably are operated by compressed air cylinders. The front clamp 91 is adapted to pick up and advance the disks B while the rear clamp 92 is adapted to pick up and return the spun bowls C from the spinning operation. When the front arm 80 has positioned a disk B facing the mandrel 81, the tailstock 93 is slid forwardly on the base 94 to engage the nose 95 of the floating spindle 96 of the tailstock in the hub hole of the disk, and as the nose enters the mandrel (FIG. 13) the clamp 91 releases the disk and arm 80 is raised. The spindle 96 has a magnetic stop plate 97 at the base of the nose 95 so that when the tailstock is retracted at the end of the spinning operation, the spun bowl C will be stripped from the mandrel 81. When the tailstock 93 is retracted to the position of FIGS. 10 and 11, the bowl C is stripped from the nose 95 by diametrically opposite stripper pins 98 mounted in a frame 99 on the tailstock base 94.

Just before the bowl is stripped from the nose 95, the rear lifting arm 84 is lowered and the clamp 92 clamps the bowl, and then when the bowl has been stripped from the nose the arm raises the bowl to the upper position indicated in FIG. 11 and the carriage is retracted to position the bowl over an inclined discharge chute 100, as indicated in full lines in FIGS. 10 and 11. The clamp 92 then releases the bowl C into the chute and the front arm 80 descends with its clamping jaws open to pick up the next disk B, whereupon the carriage again moves forward and the operation is repeated.

The spinning mandrel 81 is rotatably mounted on a headstock 101 and is driven by a motor 102 through a belt drive 103. The spinning tool or tool ring 104 is journaled in a bearing housing 105 (FIG. 13) in a yoke 106, and the yoke is carried on a cross slide 107 (FIG. 10) movable at right angles to the main slide 108 which is angularly movable on the base 94 at an angle to the axis of the headstock 101. Thus the tool ring 104 can be moved in two directions to follow the contour of the spinning mandrel 81, and the movement of the tool ring is controlled by a template 109 of proper contour, supported on the main slide and engaged by a tracer finger 110 on the cross slide. The main slide may be operated by a suitable hydraulic ram 111, and the cross slide may be operated by a suitable hydraulic ram 112.

By using suitable and well-known controls such as limit switches actuating solenoid valves controlling the operation of fluid cylinder means for the various mechanisms, the entire operation from the stack lifter for the blanks A to dropping the spun bowls C into the discharge chute 100 is carried out automatically.

During the spinning operation, as the tool ring 104 is moved to follow the contour of the spinning mandrel 81, each circumferential element of the disk is displaced axially, but not radially, of the mandrel as the tool moves along the mandrel so that the outer diameter of the disk is maintained constant at all times and the outer diameter of the finished bowl is accordingly the same as that of the original disk. The contour of the spinning mandrel is such that as the circumferential elements of the disk are successively displaced axially the thickness of the disk is gradually tapered to compensate for the axial displacement and maintain the constant outer diameter. The intermediate portion of the disk may be arcuate or a parabolic curve, and the thickness tapers in proportion to the sine of the angle formed by the tangent at any point on said curve with respect to the axis of the finished bowl; or, stated another way, the thickness tapers in accordance with the progressive change in the sine of the angle formed between the tangent to said curved portion and its axis. For example, the thickness at the hub portion may be approximately 2.5 times that of the thickness at the outer edge. Thus, the hub portion may be 0.375″ thick, and the outer edge 0.156″ thick.

Accordingly, the spinning operation performs a cold working of the metal without improperly stressing it, so that optimum physical characteristics are obtained resulting in maximum strength and resiliency in the finished product. Because of the optimum physical characteristics produced by the improved spinning operation, it is not necessary to hot or cold work the disk prior to the spinning operation; nor is it necessary to subsequently treat the metal to relieve stresses therein.

Moreover, due to the curved path followed by the tool ring, the wear on the spinning nose is distributed over its curved surface. Obviously, by providing a symmetrical nose medially of the tool ring, additional tool life can be obtained by reversing the ring.

Figure 1:
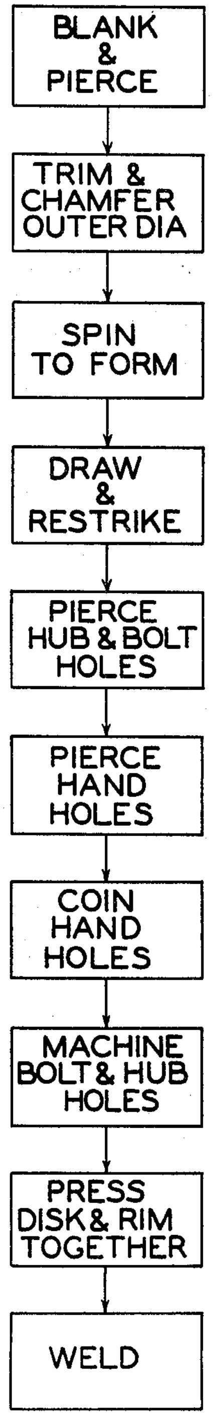
FIG. 1 is a block diagram showing the sequence of the principal operations in making disk wheels according to the present invention.
Figure 8:
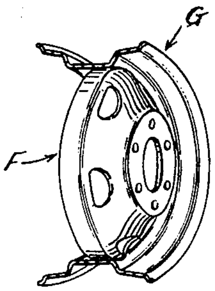
FIG. 8 is a perspective view showing the finished bowl pressed into a rim.
Figure 9:
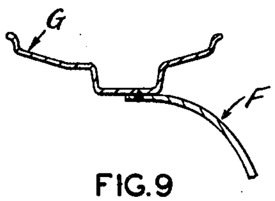
FIG. 9 is an enlarged fragmentary sectional view showing the bowl and rim welded together.

Following the spinning operation described above, suitable methods and apparatus are employed to draw and restrike the bowl D into finished shape (FIGS. 1 and 5), to pierce and machine hub and bolt holes in the bowl E (FIGS. 1 and 6), to pierce and coin hand holes in the bowl F (FIGS. 1 and 7), to die press the bowl F into a conventional rim G (FIGS. 1 and 8), and to weld the bowl F in place within the rim (FIGS. 1 and 9). For example, the methods and apparatus disclosed in the afore-mentioned copending U.S. application Serial No. 58,580 may be employed.

What is claimed is:

1. Apparatus for continuously spinning wheel disks of curved bowl shape successively from flat circular axially perforate blanks, including a linear track for guiding a succession of blanks in vertical position, a swinging rack pivotally attached parallel with said track for carrying a blank from horizontal position to vertical position at one end of said track, means for supporting a stack of blanks, a transfer arm having a floating pivot for transferring blanks successively from said stack to said rack in horizontal position, a reciprocable arm parallel to said track, means on said arm for engaging a plurality of said blanks on said track to advance them step-by-step to a plurality of stations, means at one of said stations for automatically machining the outer edge of a blank, means at another station for lubricating the surface of a blank, a turntable at the opposite end of said track for rotating each blank 90°, an overhead discharge chute running transversely of said track, a spinning mandrel aligned with said track and having a convexly curved outer surface, a tailstock aligned with said mandrel and movable toward and away therefrom and adapted selectively to hold a blank against said mandrel and a bowl spaced from the mandrel, a tool carriage mounted for substantially universal movement laterally opposite said mandrel, a spinning tool rotatably mounted in a bearing housing in a yoke on a cross slide on said carriage, a template mounted on said tool carriage, a follower on said cross slide for guiding said tool, an overhead carriage having rollers engaging a beam and movable longitudinally of said track and mandrel, a pair of vertically reciprocable lifting arms on said carriage having clamping jaws, one to clamp a blank and the other to clamp a bowl, and said arms adapted selectively to pick up a blank from the turntable and drop a spun bowl into said discharge chute, and to position a blank at the mandrel and remove a bowl from the tailstock.

2. Apparatus for continuously spinning wheel disks of curved bowl shape successively from flat circular axially perforate blanks, including a linear track for guiding a succession of blanks in vertical position, a swinging rack pivotally attached parallel with said track for carrying a blank from horizontal position to vertical position at one end of said track, means for supporting a stack of blanks, a transfer arm having a floating pivot for transferring blanks successively from said stack to said rack in horizontal position, a reciprocable arm parallel to said track, means on said arm for engaging a plurality of said blanks on said track to advance them step-by-step to a plurality of stations, a turntable at the opposite end of said track for rotating each blank 90°, an overhead discharge chute running transversely of said track, a spinning mandrel aligned with said track and having a convexly curved outer surface, a tailstock aligned with said mandrel and movable toward and away therefrom and adapted selectively to hold a blank against said mandrel and a bowl spaced from the mandrel, a tool carriage mounted for substantially universal movement laterally opposite said mandrel, a spinning tool rotatably mounted in a bearing housing in a yoke on a cross slide on said carriage, a template mounted on said tool carriage, a follower on said cross slide for guiding said tool, and means automatically to transfer blanks from said turntable to said mandrel and to transfer spun bowls from said tailstock to said overhead discharge chute.

3. Apparatus for continuously spinning wheel disks of bowl shape successively from flat circular blanks, including a linear track for guiding a succession of blanks in vertical position, means for advancing said blanks step-by-step along said track to a plurality of stations, means at one of said stations for automatically machining the outer edge of a blank, means at another station for lubricating the surface of a blank, a turntable at the discharge end of said track for rotating each blank 90°, an overhead discharge chute, a spinning mandrel aligned with said track, a tailstock aligned with said mandrel movable toward and away therefrom and adapted selectively to hold a blank against said mandrel and a bowl spaced from said mandrel, a tool carriage mounted laterally opposite said mandrel for substantially universal movement, a spinning tool journaled in a bearing housing in a yoke on a cross slide on said carriage to cooperate with said mandrel, a template mounted on said tool carriage, a follower on said cross slide for guiding said tool, an overhead carriage movable longitudinally of said track and having pick-up means thereon selectively to transfer a blank from the turntable to said mandrel and to transfer a spun bowl from said tailstock to said discharge chute.

4. Apparatus for continuously spinning wheel disks of bowl shape successively from flat circular blanks, including a linear track for guiding a succession of blanks in vertical position, means for advancing said blanks step-by-step along said track to a plurality of stations, means at one of said stations for automatically machining the outer edge of a blank, means at another station for lubricating the surface of a blank, a turntable at the discharge end of said track for rotating each blank 90°, an overhead discharge chute running transversely of said track at said discharge end, a spinning mandrel aligned with said track, a tailstock aligned with said mandrel movable toward and away therefrom and adapted selectively to hold a blank against said mandrel and a bowl spaced from said mandrel, a tool carriage mounted laterally opposite said mandrel for substantially universal movement, a spinning tool journaled in a bearing housing in a yoke on a cross slide on said carriage to cooperate with said mandrel, a template mounted on said tool carriage, a follower on said cross slide for guiding said tool, an overhead carriage movable longitudinally of said track, and a pair of pick-up arms on said carriage, one to pick up a blank and one to pick up a bowl, said arms adapted selectively to transfer a blank from the turntable to said mandrel and to transfer a spun bowl from said tailstock to said discharge chute.

5. Apparatus for continuously spinning wheel disks of bowl shape successively from flat circular blanks, including a linear track for guiding a succession of blanks in vertical position, means for advancing said blanks step-by-step along said track to a plurality of stations, a turntable at the discharge end of said track for rotating each blank 90°, an overhead discharge chute running transversely of said track at said discharge end, a spinning mandrel aligned with said track, a tailstock aligned with said mandrel movable toward and away therefrom and adapted selectively to hold a blank against said mandrel and a bowl spaced from said mandrel, a tool carriage mounted laterally opposite said mandrel for substantially universal movement, a spinning tool journaled in a bearing housing in a yoke on a cross slide on said carriage to cooperate with said mandrel, and means automatically to transfer blanks from said turntable to said mandrel and to transfer spun bowls from said tailstock to said discharge chute.

6. Apparatus for continuously spinning wheel disks of bowl shape successively from flat circular blanks, including a linear track for guiding a succession of blanks in vertical position, means for advancing said blanks along said track, a spinning mandrel spaced longitudinally of said track, a tailstock aligned with said mandrel movable toward and away therefrom and adapted selectively to hold a blank against said mandrel and a bowl formed from said blank in spaced relation from said mandrel, a tool carriage movably mounted laterally opposite said mandrel, a spinning tool journaled in a bearing housing in a yoke on a cross slide on said carriage to cooperate with said mandrel, a discharge chute running transversely of said track, an overhead carriage movable longitudinally of said track, and a pair of pick-up arms on said carriage, one to pick up a blank and one to pick up a bowl, said arms adapted selectively to transfer a blank from the discharge end of said track to said mandrel and to transfer a spun bowl from said tailstock to said discharge chute.

7. Apparatus for continuously spinning wheel disks of bowl shape successively from flat circular blanks, including a supporting table for supporting a blank in vertical position, linear track means for successively delivering blanks to said table, a spinning mandrel, a tailstock aligned with said mandrel movable toward and away therefrom and adapted selectively to hold a blank against said mandrel and a bowl at a position spaced from said mandrel, a tool carriage movably mounted laterally opposite said mandrel, a discharge chute running transversely of said linear track means, a spinning tool in a bearing housing in a yoke on said carriage to cooperate with said mandrel, and means automatically to transfer blanks from said supporting table to said mandrel and to transfer spun bowls from said tailstock to said discharge chute.

8. Apparatus for continuously spinning wheel disks of bowl shape successively from flat circular blanks, including a supporting table for supporting a blank in vertical position, linear track means for successively delivering blanks to said table a spinning mandrel, a tailstock aligned with said mandrel movable toward and away therefrom and adapted selectively to hold a blank against said mandrel and a bowl at a position spaced from said mandrel, a tool carriage movably mounted laterally opposite said mandrel, a discharge chute running transversely of said linear track means, a movable carriage having pick-up means selectively to transfer a blank from said supporting table to said mandrel and to transfer a spun bowl from said tailstock to said discharge chute.

9. Apparatus for continuously spinning wheel disks of bowl shape successively from flat circular blanks, including a supporting table for supporting a blank in vertical position, linear track means for successively delivering blanks to said table, a spinning mandrel, a tailstock aligned with said mandrel movable toward and away therefrom and adapted selectively to hold a blank against said mandrel and a bowl at a position spaced from said mandrel, a tool carriage movably mounted laterally opposite said mandrel, a discharge chute running transversely of said linear track means, a movable carriage, a pair of pick-up arms on said carriage, one to pick up a blank and one to pick up a bowl, said arms adapted selectively to transfer a blank from said supporting table to said mandrel and to transfer a spun bowl from said tailstock to said discharge chute.

10. Apparatus for continuously spinning wheel disks of bowl shape successively from flat axially perforate circular blanks, including a supporting table for supporting a blank in vertical position, linear track means for successively delivering blanks to said table, a spinning mandrel spaced longitudinally of said linear track means having an axial bore, a tailstock aligned with said mandrel and having a nose adapted to fit said bore, said tailstock movable toward and away from said mandrel and adapted selectively to penetrate a blank and hold it against said mandrel and to penetrate a bowl and hold it at a position spaced from said mandrel, a movable carriage, a pair of pick-up arms on said carriage, one to pick up a blank and one to pick up a bowl, said arms adapted selectively to transfer a blank from said supporting table to said mandrel and to transfer a spun bowl from said tailstock to a discharge location.

11. Apparatus for continuously spinning wheel disks of curved bowl shape successively from flat circular axially perforate blanks, including a linear track for guiding a succession of blanks in vertical position, a rack pivotally attached parallel with said track at one end thereof, table means for supporting a stack of said blanks, a transfer arm axially engaging said blanks for transferring blanks successively from said stack to said rack in horizontal position, a reciprocable arm parallel to said track, fingers on said arm axially engaging a plurality of said blanks on said track to advance them step-by-step to a plurality of stations, machining tools engaging the periphery of said blank at one of said stations, a turntable for rotating said blanks at the opposite end of said track, an overhead discharge chute running transversely of said track, a spinning mandrel aligned with said track having an axial bore, a tailstock having a nose adapted to fit said bore and being movable toward and away from said mandrel, said tailstock adapted selectively to penetrate a blank and hold it against said mandrel and to penetrate a bowl and hold it at a position spaced from said mandrel, stripper pins on said tailstock selectively disengaging said bowl from said nose, a tool carriage mounted laterally opposite said mandrel, a cross slide on said carriage, a yoke attached to said cross slide, a spinning tool rotatably mounted in a bearing housing attached to said yoke, a template mounted on said tool carriage, a follower on said cross slide for guiding said tool carriage, an overhead carriage having rollers engaging a beam and movable longitudinally of said track and mandrel, a pair of vertically reciprocable lifting arms on said carriage having clamping jaws, one to clamp a blank and the other to clamp a bowl, and said arms adapted selectively to pick up a blank from the turntable and drop a spun bowl into said discharge chute, and to position a blank at the mandrel and remove a bowl from the tailstock.

References Cited by the Examiner

UNITED STATES PATENTS

| | | | |
|---|---|---|---|
| 2,086,684 | 7/37 | Taylor | 198—33 |
| 2,388,545 | 11/45 | Horak | 113—53 |
| 2,467,493 | 4/49 | Pabich | 214—8.5 |
| 2,523,968 | 9/50 | Paulson | 198—221 XR |
| 2,536,720 | 1/51 | Brightly | 214—89 |
| 2,767,675 | 10/56 | McGowan | 113—52 |
| 2,902,963 | 9/59 | Roberts | 113—52 |
| 2,983,033 | 5/61 | Cox | 113—52 XR |
| 3,058,604 | 10/62 | Harper et al. | 214—89 |
| 3,069,754 | 12/62 | Wahlin | 113—52 XR |

CHARLES W. LANHAM, *Primary Examiner.*

NEDWIN BERGER, *Examiner.*

Disclaimer 3,195,491.—*Walter W. Bulgrin*, Akron, Ohio, and *Gordon C. J. Parent*, Southgate, Mich. EQUIPMENT FOR PRODUCING TAPERED DISK WHEELS. Patent dated July 20, 1965. Disclaimer filed Apr. 26, 1966, by the assignee, *The Firestone Tire & Rubber Company.*

Hereby disclaims the terminal portion of the term of said patent subsequent to August 4, 1981.

[*Official Gazette July 12, 1966.*]